United States Patent [19]

Kingsbury

[11] Patent Number: 5,180,213
[45] Date of Patent: Jan. 19, 1993

[54] BRAKE PIPE CONTINUITY VALVE SYSTEM

[75] Inventor: Ronald L. Kingsbury, Roanoke, Va.

[73] Assignee: Norfolk Southern Railway Co., Norfolk, Va.

[21] Appl. No.: 850,021

[22] Filed: Mar. 12, 1992

[51] Int. Cl.$^5$ .............................................. B60T 11/26
[52] U.S. Cl. ........................................ 303/86; 303/81
[58] Field of Search ............... 303/86, 81, 47, 1, 84.1, 303/84.2, 66, 67, 75, 77; 188/151 A; 340/453, 459, 626; 251/149.9; 213/75 R; 73/129

[56] References Cited

U.S. PATENT DOCUMENTS

| | | | |
|---|---|---|---|
| 4,520,662 | 6/1985 | Schmid | 213/75 R |
| 4,763,875 | 8/1988 | Chew | 303/86 X |
| 4,978,179 | 12/1990 | Balukin | 303/86 X |

*Primary Examiner*—Douglas C. Butler
*Attorney, Agent, or Firm*—Watson, Cole, Grindle & Watson

[57] ABSTRACT

A brake pipe continuity valve system permits the coupling of a pusher locomotive such that the engineer on the lead locomotive retains control of the entire train brake system including the pusher locomotive. The end-of-train device remains coupled to the air brake pipe line of the train, and a valve connects the air brake line pressure of the train with the air brake pipe of the pusher locomotive, upon moving the valve to an open position. The valve is automatically closed at the end of the pushing operation by the engineer on the pusher locomotive such that the brake pipe air remains intact throughout the main train including the end-of-train device, while isolating the pusher locomotive permitting it to back off at the end of the pushing operation.

4 Claims, 2 Drawing Sheets

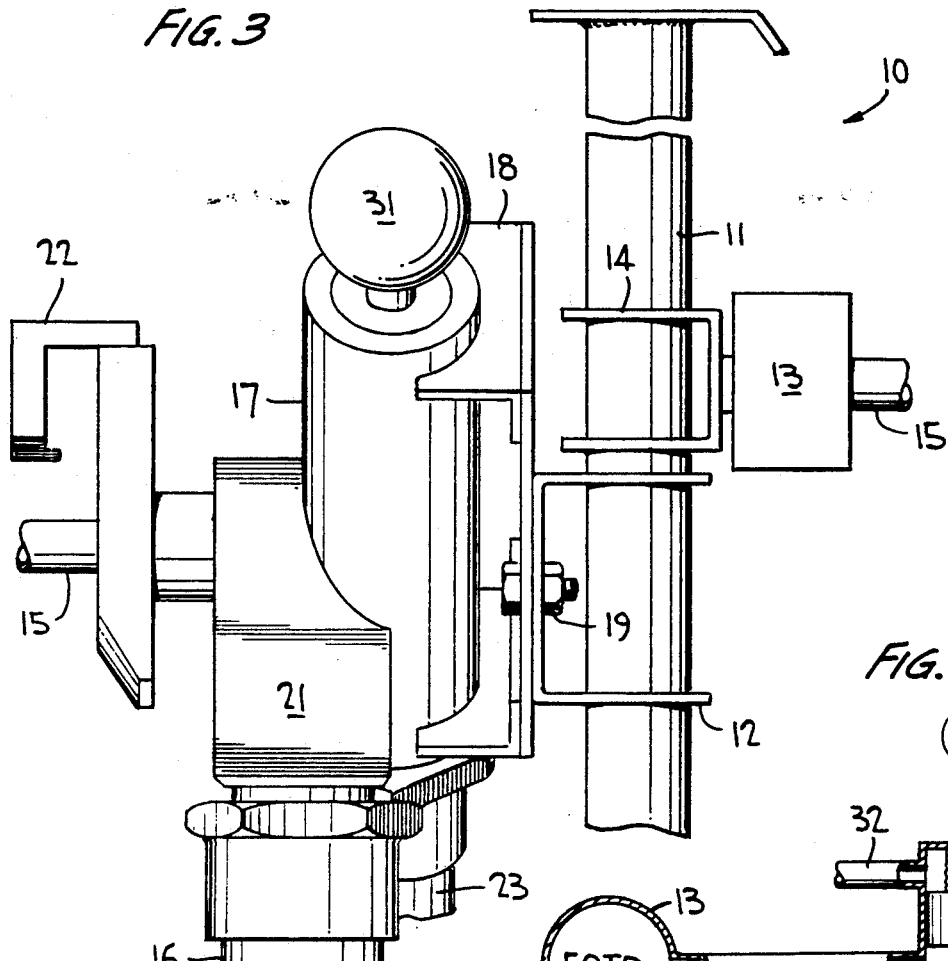
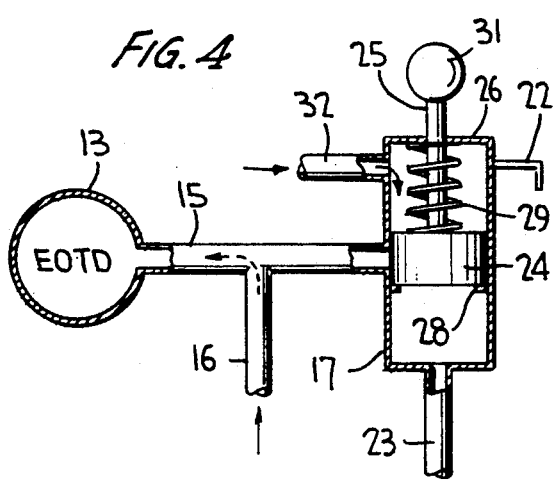
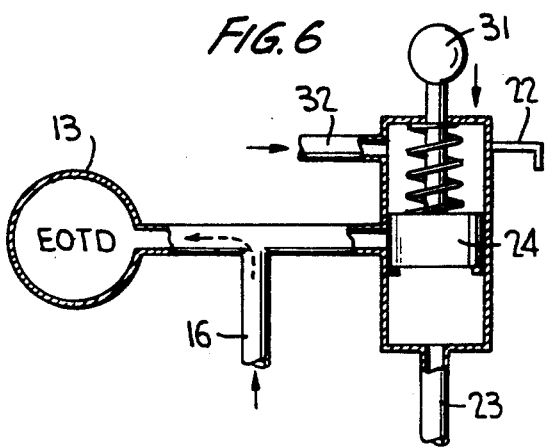

BRAKE PIPE CONTINUITY VALVE SYSTEM

BACKGROUND OF THE INVENTION

This invention relates generally to the air brake line pressure of a train of railway vehicles, and more particularly to a valve system for coupling the air brake line pressure of the train with the air brake line of a pusher locomotive to facilitate the normal operation of the brakes at the lead locomotive during and upon completion of locomotive helper service.

As is well known in this art, each railway vehicle of a conventional train braking system is provided with a brake pipe line which extends along the length of the vehicle. A continuous closed brake pipe line is formed from the lead locomotive to the end-of-train vehicle. For cabooseless trains the pressure in the last vehicle of the train must be constantly measured and checked to ensure safe operation. For this purpose and end of train (EOT) device capable of sensing and monitoring the brake line pressure and the presence of the last vehicle is typically mounted on the last vehicle at some suitable location, such as on the end coupler of the last vehicle.

The EOT device (EOTD) typically provides an output signal proportional to the air pressure within the brake pipe, repetitively monitors this output signal to measure the value of brake pipe air pressure, stores the brake pipe air pressure value, and repetitively transmits a report including the brake pipe air pressure value that is currently stored. A remote display unit mounted in the lead locomotive of the train receives each report from the EOT device, extracts the brake pipe air pressure value in each report, and displays the brake pipe air pressure value. A detailed description of the conventional railroad train braking system is set forth in U.S. Pat. No. 4,763,875, the entirety of which disclosure being hereby specifically incorporated by reference. And, a detailed description of an EOT device is set forth in the U.S. Pat. No. 4,520,662, the entirety of the disclosure of which being hereby specifically incorporated by reference.

The need oftentimes arises to assist the freight train in its climb especially up a long steep grade. For this purpose, a helper or pusher locomotive is coupled to the last vehicle of the train at the bottom of the incline and pushes the train up the grade usually until the lead locomotive extends beyond the crest of the incline by some predetermined car lengths.

In helper service federal regulations require that the engineman of the lead locomotive operate the brakes of the train including the pusher locomotive. Because of this requirement, the EOT device on the last vehicle must presently be either removed or disconnected, the brake pipe gladhand connection on the last vehicle must be disconnected, and the brake pipe connections to the helper locomotive must be reconnected before the helper locomotive can assist the train.

Also, at the top of the hill, the pusher locomotive must presently be stopped, the brake pipe hose from the helper locomotive must be disconnected, the EOT device must be reinstalled if earlier removed, and the brake pipe hose between the last vehicle and the EOT device must be reconnected.

SUMMARY OF THE INVENTION

It is therefore an object of the present invention to maintain the EOT device coupled to the air brake pipe line of the train at all times to facilitate the normal operation of the brakes at the lead locomotive during helper service. The brake pipe line of the train therefore need not be uncoupled from the EOT device, or the EOT device removed, in readiness for the pusher locomotive as before. Also, the brake pipe line of the train need not be again coupled to the EOT device, as before, when pushing is complete and the helper locomotive wants to cut off.

These objectives are met by the provision of a brake pipe continuity valve system which couples the air brake line pressure of the train with the air brake line of the pusher locomotive while the EOT device is coupled in place to thereby facilitate control of the brake operation by the locomotive engineer in the lead locomotive. The air brake pressure of the train is therefore transmitted to the air brake line of the pusher locomotive, and the EOT device functions as before in sensing and monitoring the air brake line pressure of the train and the presence of the pusher locomotive which now becomes the last vehicle of the train.

The valve system comprises a valve housing coupled to the air brake pipe line of the train and is, together with the EOT device, mounted at a convenient location on the last car of the train.

The valve housing is also coupled to an air brake pipe hose of the pusher locomotive. The housing contains a valve for blocking communication between the air brake pipeline and the air brake pipe hose in a closed position. The valve is manually movable within the housing to an open position to establish communication between the air brake pipe line and the air brake pipe hose.

The valve may be slidingly moveable to its open position, and may be maintained in such open position by the air brake line pressure.

The valve may be spring biased into its closed position, and the air brake line pressure is at such a level as to overcome the spring bias force for maintaining the valve in its open position.

Moreover, the valve housing may be coupled to a high pressure line of the pusher locomotive for moving the valve from its open position to its closed position for uncoupling the air brake line of the pusher locomotive from the air brake line pressure of the train when pushing is complete and the helper wants to push off.

Other objects, advantages and novel features of the invention will become more apparent from the following detailed description of the invention when taken into conjunction with the accompanying drawings.

BRIEF DESCRIPTION OF THE DRAWINGS

FIG. 3 is a right side elevational view of the valve system of FIG. 2; and

FIGS. 4, 5 and 6 are schematic views of the brake pipe continuity valve system of the invention coupled to the end-of-train device and illustrating the valve operation.

DETAILED DESCRIPTION OF THE INVENTION

Figure 1:
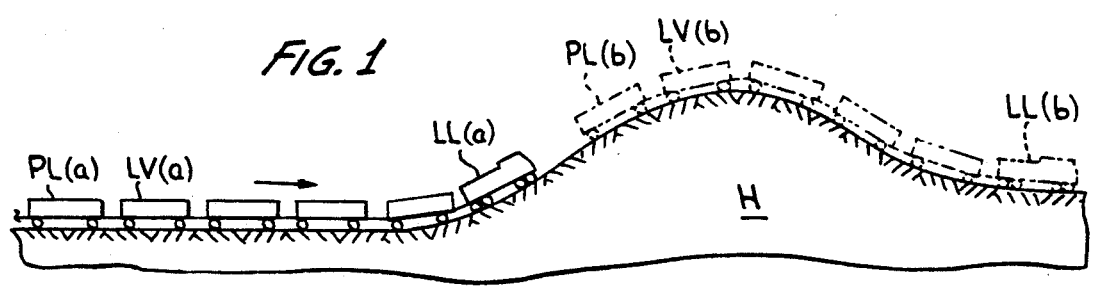
FIG. 1 is a schematic illustration of a railway train and a pusher locomotive in each of two positions relative to an upgrade.

Turning now to the drawings wherein like reference characters refer to like and corresponding parts throughout the several views, FIG. 1 schematically illustrates a train of railway vehicles with its lead locomotive at the LL(a) position, i.e., at the foot of hill H. Pusher locomotive PL(a) is illustrated as coupled to the last vehicle LV(a) of the train at the (a) position.

Typically, the pusher locomotive helps in moving the train up the incline such that when the train and the pusher reach the (b) position, the pusher locomotive is uncoupled from the last vehicle LV(b), returns to the bottom of the incline, moves to an off track, and awaits another freight train to help it in moving up the incline.

Figure 2:
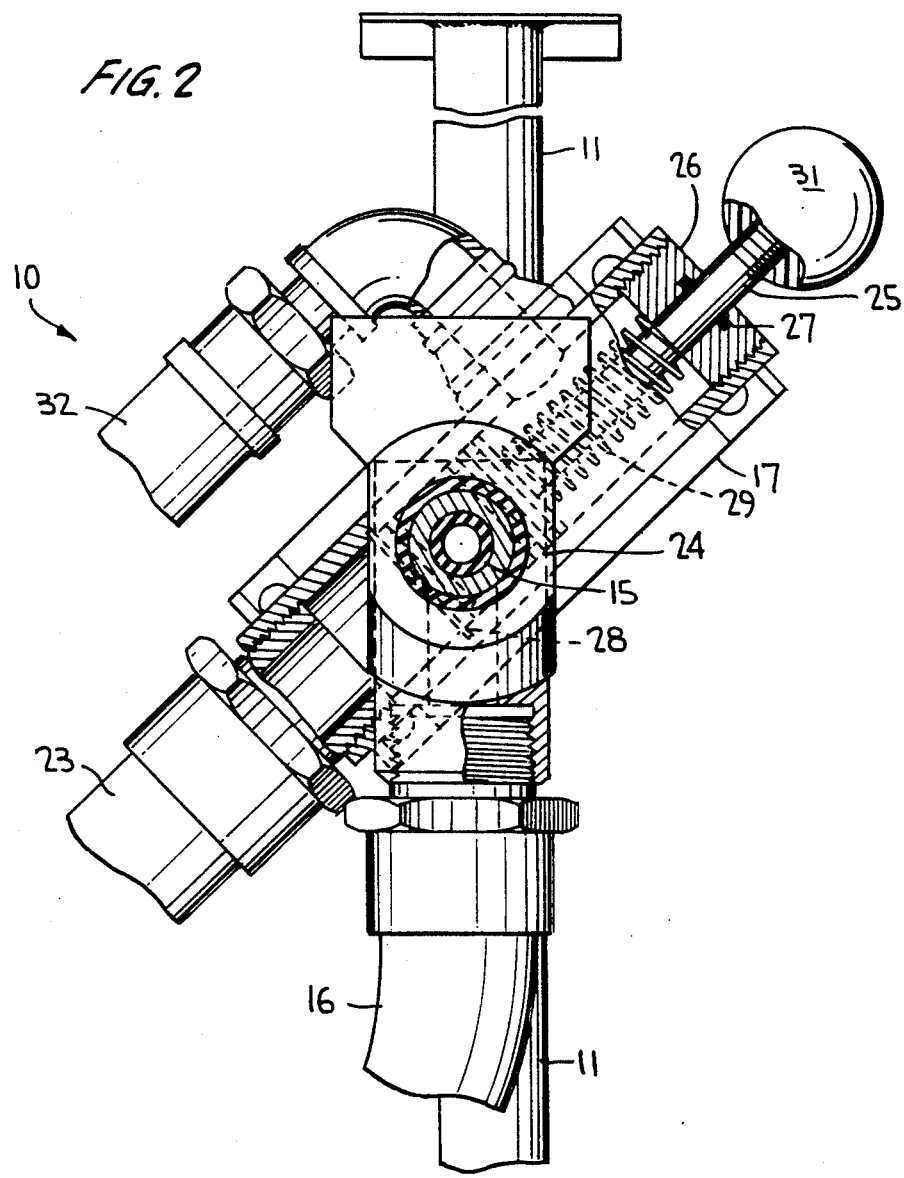
FIG. 2 is a front elevational view of the brake pipe continuity valve system according to the invention.

The brake pipe continuity valve system according to the invention is generally designated 10 in FIGS. 2 and 3 as mounted on a staff 11 by bracket 12 or the like welded to the staff or otherwise connected thereto. The end-of-train device (EOTD) 13 is likewise mounted on the staff by a bracket 14 or the like, the EOTD having a flexible air pressure hose 15 coupled to air brake pipe line 16 of the train via suitable gladhand connectors (not shown).

The valve system includes a valve housing 17 having a side support 18 connected as at 19 to bracket 12 for mounting the valve housing to staff 11. Air brake pipe line 16 has a fitment 21 welded or otherwise connected to valve housing 17.

The valve assembly together with the end-of-train device are clamped on to the last vehicle of the train, such as to the car coupler, using a suitable clamp 22 (FIG. 4). Otherwise, clamp 22 forms no part of the present invention.

At the foot of the hill, location (a) of FIG. 1, an air brake pipe hose 23 of the pusher locomotive is coupled to valve housing 17 with the use of the suitable gladhand connector (not shown).

A valve which may be in the form of a cylindrical cup 24, is mounted for sliding movement within valve housing 17, the valve cup being shown in its closed position in FIGS. 2, 4 and 6. In this closed position, the valve blocks communication between air brake pipe line 16 and air brake pipe hose 23.

The valve cup has a stem 25 extending outwardly of the valve housing through an opening in end wall 26 of the housing, the valve stem being surrounded by a seal ring 27 for fluid sealing the interior of the housing.

The valve cup is in sealing engagement with the inner wall of the valve housing, and bears against an 0-ring 28 acting as a stop for limiting inward movement of the valve cup. And, a coil spring 29 extending between the valve cup and end wall 26 resiliently urges the valve cup to its closed position of FIGS. 2, 4 and 6.

The valve stem terminates at its outer end in a hand grip in the form of a spherical knob 31 or the like.

Reference is now made to FIGS. 4 and 5 in describing the operation of the present invention. The end-of-train device 13 is coupled at all times to air brake line 16 of the train for sensing and monitoring the brake line pressure and the presence of the last vehicle. The EOTD is mounted on the last vehicle with the remote display unit (not shown) being mounted in the lead locomotive. The EOTD functions in known manner for ultimately transmitting a message including the brake pipe air pressure value to the remote display unit where it is read and interpreted by the engineman in the lead locomotive.

When a pusher locomotive is needed for the train, air brake pipe hose 23 of the pusher locomotive is coupled to valve housing 17 in some normal manner while the valve cup in located the FIG. 4 closed position.

The valve cup is manually shifted to its FIG. 5 position against the force of spring 29 to thereby establish communication between air brake pipe line 16 and air brake pipe hose 23 of the pusher locomotive. Thus, air brake pressure of the train will only pass through to the helper locomotive when the actuator knob 31 is moved to its open position of FIG. 5. The valve cup is held in place in its FIG. 5 open position by air brake pipe pressure and will not permit the valve cup to shift back to its closed position since the approximately 75 psi of air brake line pressure acting on the face of the valve cup overcomes the spring force of coil spring 29 acting on the back face of the valve cup. For this purpose, therefore, the coil spring is designed as having a spring force of less than 75 psi.

In this configuration, the engineer on the lead locomotive has complete control of the entire train brake system including that of the helper locomotive.

Prior to commencement of the pushing operation, a high pressure actuating air line 32 of the pusher locomotive is connected to valve housing 17 in some normal manner. The train is then pushed up the hill from the (a) position of FIG. 1 to the (b) position or the like as in any normal pushing operation. When pushing is complete at the (b) position (or at some other predetermined position) and the helper locomotive wants to cut off, the engineer on the helper locomotive depresses an independant brake valve handle (not shown). This action performs two basic operations: one, it raises the lock-lift assembly on the helper coupler thereby allowing the helper knuckle to release the coupling with the last car of the train; and two, it applies pressure of approximately 140 psi via air line 32 on the back face of the valve cup, as illustrated in FIG. 6, overcoming the 75 psi brake pipe pressure to therefore reclose the valve cup by moving it to its FIG. 6 position where it again blocks communication between lines 16 and 23.

At this stage of the operation the brake pipe air is intact throughout the main train, including the end-of-train device. However, the pusher locomotive is isolated from the train brake pipe air such that the helper locomotive can back off until both the brake pipe 23 and actuating line 32 gladhands have disconnected. The main train can then proceed to its destination without stopping, and the pusher locomotive can return to the bottom of the mountain and repeat the aforedescribed process for another train.

From the foregoing it can be seen that a simple and economical yet highly effective brake pipe continuity valve system has been devised such that the end-of-train device mounted on the last car of the train remains coupled to the air brake pipe line of the air brake line pressure of the train permitting the engineer on the lead locomotive to maintain complete control of the entire train brake system including the pusher locomotive. The end-of-train device therefore need not be uncoupled or disconnected from the last car in readiness for a pusher locomotive as before, and the air coupling and uncoupling operations heretofore required between the pusher locomotive and the last car are avoided.

Obviously, many modifications and variations of the present invention are made possible in the light of the above teachings. For example, the valve housing may include a movable valve other than a sliding valve as disclosed without departing from the invention. It is therefore to be understood that within the scope of the appended claims the invention may be practiced otherwise than as specifically described.

What is claimed is:

1. In a railway train having an air brake pipe line at a predetermined air brake line pressure and an end-of-train monitoring device mounted on a last vehicle of the train and coupled to said air brake pipe line for sensing and monitoring the air brake line pressure of the train and the presence of the last vehicle and permitting brakes to be normally operated at a lead locomotive of the train, a valve system for coupling the air brake line pressure of the train with an air brake line of a pusher locomotive to facilitate normal operation of the brakes at the lead locomotive, the valve system comprising a valve housing coupled to said air brake pipe line, said valve housing also being coupled to an air brake pipe hose of the pusher locomotive, a valve in said housing for blocking communication between said air brake pipe line and said air brake pipe hose in a closed position of said valve, said valve being manually movable within said housing to an open position establishing communication between said air brake pipe line and said air brake pipe hose, whereby normal operation of the brakes at the lead locomotive of the train is facilitated without the need for removing the end-of-train device from the last vehicle and without the need for uncoupling the device from said air brake pipe line.

2. In the railway train according to claim 1, wherein said valve is slidingly movable to said open position and is maintained in said open position by air brake line pressure.

3. In the railway train according to claim 2, wherein said valve is spring biased into said closed position, air brake line pressure overcoming spring bias force for maintaining said valve in said open position.

4. In the railway train according to claim 1, wherein said valve housing is coupled to a high pressure line of the pusher locomotive for moving said valve from said open position to said closed position for uncoupling the air brake line of the pusher locomotive from the air brake line pressure of the train.

* * * * *